United States Patent

Niccolini et al.

(10) Patent No.: US 9,032,515 B2
(45) Date of Patent: May 12, 2015

(54) METHOD FOR DETECTING ATTACKS TO MULTIMEDIA SYSTEMS AND MULTIMEDIA SYSTEM WITH ATTACK DETECTION FUNCTIONALITY

(75) Inventors: Saverio Niccolini, Heidelberg (DE); Thilo Ewald, Leimen (DE); Stefan Schmid, Heidelberg (DE)

(73) Assignee: NEC Europe Ltd., Heidelberg (DE)

( * ) Notice: Subject to any disclaimer, the term of this patent is extended or adjusted under 35 U.S.C. 154(b) by 1163 days.

(21) Appl. No.: 12/674,480

(22) PCT Filed: Aug. 21, 2007

(86) PCT No.: PCT/EP2007/007355

§ 371 (c)(1),
(2), (4) Date: May 5, 2010

(87) PCT Pub. No.: WO2009/024169

PCT Pub. Date: Feb. 26, 2009

(65) Prior Publication Data

US 2011/0041181 A1  Feb. 17, 2011

(51) Int. Cl.
*G06F 11/00* (2006.01)
*H04L 29/06* (2006.01)

(52) U.S. Cl.
CPC ...... *H04L 29/06027* (2013.01); *H04L 63/1425* (2013.01); *H04L 65/1006* (2013.01); *H04L 65/1079* (2013.01)

(58) Field of Classification Search
USPC .................................................. 726/22, 23
See application file for complete search history.

(56) References Cited

U.S. PATENT DOCUMENTS

| | | | |
|---|---|---|---|
| 5,339,310 A * | 8/1994 | Taniguchi | 370/397 |
| 2003/0031185 A1* | 2/2003 | Kikuchi et al. | 370/400 |
| 2003/0212903 A1 | 11/2003 | Porras et al. | |
| 2006/0288411 A1* | 12/2006 | Garg et al. | 726/22 |
| 2007/0091811 A1 | 4/2007 | Thubert et al. | |
| 2008/0229415 A1* | 9/2008 | Kapoor et al. | 726/22 |

FOREIGN PATENT DOCUMENTS

| | | |
|---|---|---|
| JP | 2003283571 A | 10/2003 |
| JP | 2004164107 A | 6/2004 |
| WO | 2005/109754 | 11/2005 |

OTHER PUBLICATIONS

International Search Report dated May 23, 2008, from corresponding PCT application.
Translation of Japanese Office Action dated May 23, 2012, from corresponding JP application.

* cited by examiner

*Primary Examiner* — Tamara T Kyle
(74) *Attorney, Agent, or Firm* — Young & Thompson

(57) ABSTRACT

A method for detecting attacks to multimedia systems, wherein a communication path (1) is established within the multimedia system by a multimedia communication flow between a communication source and a communication destination, is characterized in that at least two devices (3, 4, 8) are provided along the communication path (1), each the device (3, 4, 8) acting as inspection device (2) that is enabled to inspect the multimedia communication flow that transits the inspection device (2), and that the results of the single inspections are accumulated along the communication path (1). Furthermore, a multimedia system with attack detection functionality is described.

15 Claims, 1 Drawing Sheet

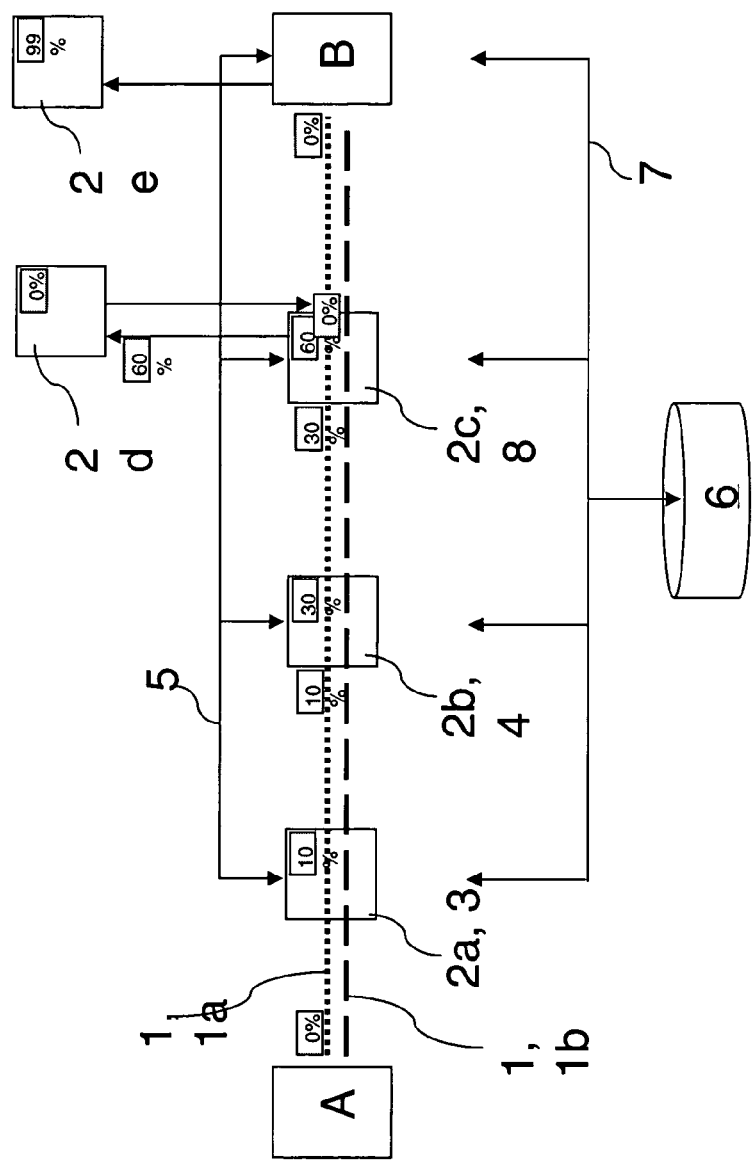

METHOD FOR DETECTING ATTACKS TO MULTIMEDIA SYSTEMS AND MULTIMEDIA SYSTEM WITH ATTACK DETECTION FUNCTIONALITY

The present invention relates to a method for detecting attacks to multimedia systems, wherein a communication path is established within the multimedia system by a multimedia communication flow between a communication source and a communication destination.

Furthermore, the invention concerns a multimedia system with attack detection functionality, wherein a communication path is established within the multimedia system by a multimedia communication flow between a communication source and a communication destination.

Today multimedia systems are widely spread and offer users an enormous variety of different services. In the context of the present invention the term "multimedia system" is to be understood in a broad sense and includes, for example, IMS (IP Multimedia Subsystem), which typically provides for services like VoIP (Voice over IP) or presence information, or NGNs (Next Generation Networks), in which services are provided in general by means of so called service delivery platforms (SDP).

Nowadays multimedia systems are increasingly exposed to various forms of attacks which include, for instance, DoS (Denial of Service) attacks, or VoIP Phishing. In the area of electronic mail unsolicited bulk email messages—so-called SPAM—have become very common and have turned into a severe problem. Not only companies that require email communication are impacted by SPAM messages, but also private users are very annoyed by SPAM. Many Internet users nowadays receive more SPAM messages than regular emails. For this reason, almost every server for incoming email uses SPAM filters which check incoming mails according to defined rules. They search, for example, actively for key words in the content of an email, they check specific configurations of the server used for sending the email or they search for senders that are often used for sending bulk emails. In case of a matching classification of an email as SPAM, it is marked and/or sorted out.

In the area of—analog or digital—telephony, SPAM (in this context referred to as SPIT, Spam over Internet Telephony) also occurs more and more often, as it can be seen, for example, in case of unsolicited commercial calls. These calls are mostly made by automated calling machines. Due to the currently and mainly employed switched telephone networks, such SPAM calls are very complicated and expensive which is the reason for a rather restricted number of SPAM calls. When Internet telephony will be used more commonly though, such SPAM calls will become much easier and cheaper, so a tremendous increase of SPAM calls in advanced modern multimedia systems will have to be assumed.

A severe problem is the detection of attacks to multimedia systems as described above. Today the detection of attacks to multimedia systems is performed mainly by using Intrusion Detection Systems (IDS). These IDS systems are able to monitor the traffic passing by and to take a local decision depending, for example, on the observed traffic structure or traffic content.

Apart from such locally acting IDS systems, distributed attack detection schemes are already known in prior art. One such system is described by V. Apte et al. in "SpaceDive: A Distributed Intrusion Detection System for Voice-over-IP Environments", in *Proceedings of DSN* 06, *The International Conference on Dependable Systems and Networks (Fast Abstracts session)*. SpaceDive is a hierarchical correlation based system that can be decomposed into a local-level design and a network-level design. Although the mentioned distributed intrusion detection for VoIP environments brings certain advantages compared with locally implemented IDS systems, the solution is still not entirely satisfying. The main problem is to be seen in the hierarchical architecture which renders the system complicated both with respect to implementation as well as with respect to application issues, and which requires considerable additional signaling.

It is therefore an object of the present invention to improve and further develop a method and a system of the initially described type in such a way that by employing mechanisms that are readily to implement efficient attack detection is possible without the requirement for extensive further signaling.

In accordance with the invention, the aforementioned object is accomplished by a method comprising the features of claim 1. According to this claim, such a method is characterized in that at least two devices are provided along the communication path, each said device acting as inspection device that is enabled to inspect the multimedia communication flow that transits said inspection device, and that the results of said single inspections are accumulated along the communication path.

The problem mentioned above is furthermore solved by the multimedia system with attack detection functionality. According to this, the system is characterized in that the multimedia system comprises at least two devices located along the communication path, each said device acting as inspection device that is enabled to inspect the multimedia communication flow that transits said inspection device, and that the multimedia system further comprises a mechanism for accumulating the results of said single inspections along the communication path.

According to the invention, it has first been recognized that complicated hierarchical structures can be avoided by performing network-distributed attack detection along a communication path of a multimedia communication flow to be observed. To this end at least two devices are provided along the communication path, which are enabled to inspect the multimedia communication flow that transits said inspection devices. The inspection devices may be special devices integrated into the multimedia system solely for said inspection purpose. Alternatively, the inspection devices may be devices which are existent in the multimedia system anyway, and which are supplemented with some adequate inspection functionality.

According to the invention, the results of the single inspections performed by the at least two inspection devices along the communication path are accumulated to obtain an overall result for the multimedia communication flow under observation. In other words, the information computed at single points of observation is gathered together for the purpose of making decisions towards the identification of a malicious transaction. The overall result inheres a global significance and benefit from the different attack detection mechanism applied. The invention considers the fact that multimedia systems have the notion of a communication path and exploits such notion of a communication path for the purpose of distributing the attack detection to different modules cooperation among each other. With respect to the distribution of the attack detection over several inspection devices within the multimedia system, all inspection devices can be regarded as equal and there are only plain and simple interactions between inspection devices involved. Insofar, the method and the system according to the invention are less complex as compared with hierarchical approaches known from prior art.

As regards a specific application in the context of a Voice-over-IP scenario, the communication source may be a caller and the communication destination may be a callee. In case of an email SPAM protection application the communication source/destination may be the sender/receiver of the email. However, in other application scenarios the communication source may be e.g. a user accessing a certain service. The service may be offered within the multimedia system and may be, for example, downloadable from a server which in that case functions as communication destination.

Regarding a simple handling of data related to inspection results it may be provided that each inspection device forwards information about the result of its inspection to subsequent inspection devices along the communication path. More specifically, it may be provided that each inspection device communicates its partial result only to its proximate inspection device along the communication path in a direction towards the communication destination. The information being forwarded may not only include the inspection result itself, but in addition information related to the kind of inspection(s) performed and/or to the modules used and/or parameters that were used for the computation of the partial inspection result and/or an accumulated result. By this means it can be assured that certain communication characteristics are not contributing twice to the accumulated overall result.

Instead of a hop-wise forwarding of inspection related information, the information may be shared between all inspection devices along the communication path. Compared with a pure forwarding scheme, a sharing of information has the advantage that inspection devices located close to the communication source also gain knowledge of the results of inspections performed by devices which are located closer to the communication destination.

The dissemination of inspection related information among the inspection devices—regardless of whether a chain like hop-to-hop forwarding along the communication path or a sharing between all inspection devices along the communication path is realised—may be performed by using signaling extensions. The signaling extensions may be implemented on IP level or by using the respective protocol which is employed for the communication messages under inspection. In case of Voice-over-IP this protocol may be SIP (Session Initiation Protocol) which is widely spread and offers various possibilities to integrate extra information in the appropriate SIP header. Information may be added by using XML encoding or by referencing the information through a link to a web service.

Whereas the signaling modification as described above can be regarded as "in-band" approach, an "out of band" information sharing technique is also possible. In this context the sharing of inspection related information between the inspection devices is performed by means of an apposite distributed database and/or external applications (e.g. Application Servers, ad-hop devices, etc.). The database/external application is accessible by the inspection devices wherein the access may be secured by appropriate means. It may be provided that each inspection device writes its inspection result to the database where the next hop inspection device can retrieve it univocally.

In a preferred environment the decision of whether a multimedia communication flow constitutes an attack to the multimedia system is taken on the basis of the accumulated results of all single inspections. Advantageously, the results of the single inspections are provided in form of a score and/or a probability indicating the maliciousness of the communication flow. In such case the accumulation of the results of the single inspections may be performed by the way of computing a path-cumulative score and/or probability, e.g. by adding the single scores and/or probabilities. Before adding the single scores/probabilities a weighting of the single inspection results may be performed in order to take into account that some kinds of inspections in certain situation may have a lower significance than others.

In a further preferred embodiment each inspection device is enabled to enforce proper reactions on the communication flow depending on the results of inspections performed by previous inspections devices along the communication path. In this context it may be provided that an inspection device is enabled to e.g. block a communication, to quarantine a user, etc. In particular, such measures may be taken by an inspection device in case that the maliciousness score/probability resulting from the accumulated inspections performed by preceding inspection devices exceeds a pre-set threshold.

As regards an effective avoidance of disturbances of the multimedia communication flow caused by the inspections it may be provided that at least the first inspection along the communication path is performed on a signaling part of the multimedia flow. In a preferred embodiment, a second stage inspection, i.e. an inspection on the media part of the multimedia communication flow, is only performed in case the path-cumulative score and/or probability exceeds a pre-set threshold. If on the other hand the path-cumulative score/probability resulting from inspections performed on the signaling part of a multimedia communication flow is below the pre-set threshold, inspections on the media part of the multimedia communication flow may be omitted. For example, in VoIP applications second stage inspections may include caller interaction checks, like a Turing Test (as described in detail in DE 10 2005 029 287 A1), a Voice Printing Test (as described in "Voice Printing and Reachability Code (VPARC) Mechanism for SPIT", WIPRO, white paper), Audio CAPTCHA (Completely Automated Public Turing test to tell Computers and Humans Apart), grey-listing tests, etc. The division in first stage inspections (i.e. on the signaling part of the communication flow) and second stage inspections (i.e. on the media stream) has the advantage that inconveniences caused by the inspections are significantly reduced both on the side of the caller as well as on the side of the callee.

The inspection devices along the communication path may include network devices, i.e. devices which are part of common multimedia systems and which are equipped with attack detection functionality. Such network devices may include Session Border Controllers (SBC), SIP proxy server, network routers, application layer firewalls, gateways, etc. In addition to these network devices the inspection devices may include User Equipment (UE). For instance, in VoIP scenarios the callee's User Equipment, i.e. his telephone device, may be involved in the attack detection process, e.g. by performing a user-specific check based on a white/black lists stored in the callee's telephone.

Advantageously, each inspection device checks the communication according to hop/device specific criteria for attack detection. For example, inspection devices located at the boarder of the multimedia system (like e.g. the SBC) may preferably perform checks based on rather global issues trying to detect anomalies which are more evident when a big portion of the traffic is under observation. These checks may include, for instance, a check for global black lists, a check of caller message rates, a check for spoofing attempts, etc. On the other hand, network devices located deeper inside the multimedia system may perform checks which are more user orientated. For example, servers like a serving SIP Proxy Server may apply checks on the basis of user defined preferences (e.g. personal, user specific white/black lists, etc.) that could not be applied in a scalable manner at the border of the network where the number of users is much higher.

Regarding legal compliance it may be provided that the inspections performed by the inspection devices, the process of dissemination of inspection related information and/or the process of enforcing reactions on the communication flow can be configured according to preferences specified by the communication destination. In particular in VoIP application this means that callee preferences are taken into account (either directly or indirectly) to assure that no calls are e.g. blocked without the callee's consent.

There are several ways how to design and further develop the teaching of the present invention in an advantageous way. To this end, it is to be referred to the following explanation of a preferred example of an embodiment of the invention illustrated by the drawing. In connection with the explanation of the preferred example of an embodiment of the invention by the aid of the drawing, generally preferred embodiments and further developments of the teaching will be explained.

BRIEF DESCRIPTION OF THE DRAWINGS

In the drawing the only FIGURE illustrates an application scenario of a method according to the present invention for detecting attacks to a multimedia system.

DETAILED DESCRIPTION OF THE INVENTION

The only FIGURE illustrates—schematically—an embodiment of a method according to the invention for detecting attacks in form of SPAM calls (SPIT) in a VoIP system. More specifically, a VoIP call shall be established between a caller A and a callee B. Thus, between caller A and callee B a communication path 1 is established wherein caller A functions as communication source and callee B functions as communication destination. In the specific example shown in the FIGURE the communication between caller A and callee B is a SIP (Session Initiation Protocol) communication. The SIP signaling part 1a of the communication flow is indicated by the dotted line, whereas the media stream 1b of the multimedia communication flow is indicated by the dashed line.

Initially the call request initiated by caller A, i.e. the SIP invite message, is assigned a 0% probability of constituting an attack. On its way to the callee B the message transits a first inspection device 2a which in the specific case is a Session Border Controller (SBC) 3. The SBC 3 performs a first attack detection inspection of the communication flow, e.g. performs a check of global black lists and/or spoofing attempts. As a result of these tests it turns out that the communication flow has a 10% probability of being an attack. The result is forwarded to the next inspection device 2b along the communication path 1 which is a P-CSCF (Proxy-Call Session Control Function) SIP Proxy Server 4. The propagation from one hop to the next one can be realized either by means of proper marking the communication messages (e.g. by means of additional SIP headers, IP marking, etc.) which is indicated by the—logical of physical—link 5. Alternatively, it is possible to write the results to a database 6 which is accessible by each hop/device via link 7. The database 6 may contain scoring info like the score/probability itself, information regarding the methods and parameters used to compute the score as well as information to univocally identify the communication.

The second inspection performed by the P-CSCF 4, which may be a check of user specific white/black lists, cumulated with the first inspection performed by the SBC 3 results in a path-cumulative probability of 30% that the communication flow constitutes a malicious communication transaction. This 30% score is forwarded to the proceeding inspection device 2c along the communication path 1 which is an S-CSCF (Serving-Call Session Control Function) 8. The S-CSCF 8 performs further inspections. On the basis of these inspections the S-CSCF 8 refines the received path-cumulative score of 30% by increasing it by additional 30% resulting in an overall probability of 60%.

The 60% score obtained by the S-CSCF 8 exceeds a pre-set threshold and, thus a more sophisticated second stage inspection which involves a caller interaction check is enforced by the S-CSCF 8. To this end the communication flow is directed to the inspection device 2d which performs a caller interaction check, specifically e.g. a Turing Test. In the specific case shown in the FIGURE the caller interaction test results in that an attack can be excluded. Consequently, the path-cumulative score is set to 0% and the 0% attack probability is given back to the S-CSCF 8. It is to be noted that the caller interaction inspection may be performed by the same device, i.e. by the S-CSCF 8 itself, or as shown in the FIGURE by remote inspection device 2d.

Finally, the 0% score is forwarded to the callee B. The callee B may also function as inspection device, or, as shown in the FIGURE, may direct the communication flow to a another remote inspection device 2e. The remote inspection device 2e performs a final inspection. In the specific case it checks the communication flow for a user specific black list. As it finds the caller A contained in the black list, the inspection device 2e assigns the communication flow an attack probability of 99%. Consequently, as this probability exceeds a pre-set threshold, the inspection device 2e enforces a proper reaction on the communication flow, which in this case would be a blocking of the call.

For the sake of simplicity the signaling part 1a and the media stream 1b of the communication flow are depicted as flowing along the same communication path 1. However, this may not necessarily be the case, and in practice the signaling part 1a may take another way than the media stream 1b. Consequently, the signaling part 1a and the media stream 1b would transit different inspection device and would thus be inspected by different devices.

It is to be noted that all reactions enforced to the communication flow should take into account preferences specified by the callee B (either directly or indirectly) in order to be legally compliant.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for detecting SPAM over Internet Technology (SPIT) in a Voice over Internet Protocol (VoIP) system, comprising:
   establishing a specified communication path (1) within the VoIP system, the specified communication path carrying a VoIP communication flow between a caller and a callee,
   wherein at least two devices (3, 4, 8) are provided along the specified communication path (1), each said device (3, 4, 8) acting as a SPIT inspection device (2) that is enabled to inspect the VoIP communication flow that transits said inspection device (2) for a SPIT attack, wherein the results of said single inspections are accumulated along the specified communication path (1), wherein the results of said single inspections are provided for the specified communication path in a form of a score and/or a probability indicating a likelihood of a SPIT attack, wherein the accumulation of the results of said single inspections is performed by computing a specified communication path-cumulative score and/or probability, and wherein each said inspection device (2) forwards information about the result of its inspection to subsequent inspection devices (2) along the specified communication path (1).

2. Method according to claim 1, further comprising forwarding information about the performed inspection itself.

3. Method according to claim 1, wherein information related to inspections performed by single inspection devices (2) is shared between all said inspection devices (2).

4. Method according to claim 1, wherein the forwarding of said inspection related information is performed by means of signaling extensions.

5. Method according to claim 1, wherein the forwarding of said inspection related information is performed by means of a database (6) which is accessible by said inspection devices (2).

6. Method according to claim 1, wherein the decision of whether said VoIP communication flow constitutes a SPIT attack is taken on the basis of the accumulated results of said single inspections.

7. Method according to claim 1, wherein each said inspection device (2) is enabled to enforce reactions on the communication flow depending on the results of inspections performed by previous inspection devices (2) along the specified communication path (1).

8. Method according to claim 1, wherein at least the first inspection along said specified communication path (1) is performed on a signaling part (1*a*) of the VoIP communication flow.

9. Method according to claim 1, further comprising performing an inspection of a media part (1*b*) of the VoIP communication flow when the specified communication path-cumulative score and/or probability exceed a pre-configurable threshold.

10. Method according to claim 1, wherein inspections performed by an inspection device (2) located at the border of the VoIP system includes a check for global black lists, a check of caller message rates and/or a check for spoofing attempts.

11. Method according to claim 1, wherein the inspections performed by the inspection devices (2) and the accumulation of inspection related information are configured according to preferences specified by the communication destination.

12. A VoIP system with SPIT detection functionality, wherein a specified communication path (1) is established within the VoIP system, the specified communication path having a VoIP communication flow between a caller and a callee, the VoIP system comprising:

at least two devices (3, 4, 8) located along the specified communication path (1), each said device (3, 4, 8) acting as inspection device (2) that is enabled to inspect the VoIP communication flow that transits said inspection device (2) for a SPIT attack, and a mechanism for accumulating the results of said single inspections along the specified communication path (1), wherein the results of said single inspections are provided for the specified communication path in a form of a score and/or a probability indicating a likelihood of a SPIT attack, wherein the accumulation of the results of said single inspections is performed by computing a specified communication path-cumulative score and/or probability, and wherein each said inspection device (2) is configured to forward information about the result of its inspection to subsequent inspection devices (2) along the specified communication path (1).

13. The VoIP system according to claim 12, wherein a database (6) accessible by said inspection devices (2) is provided for sharing of said inspection related information between said inspection devices (2).

14. The VoIP system according to claim 12, wherein said inspection devices (2) include at least one of a Session Border Controller (3), a SIP Proxy Server (4, 8) and a Network Router.

15. The VoIP system according to claim 12, wherein said inspection devices (2) include User Equipment.

* * * * *